April 27, 1954

R. J. GAUBERT 2,676,444

BAG SEALING MACHINE

Filed Aug. 6, 1951

INVENTOR.
Rene J. Gaubert
BY

ATTORNEYS

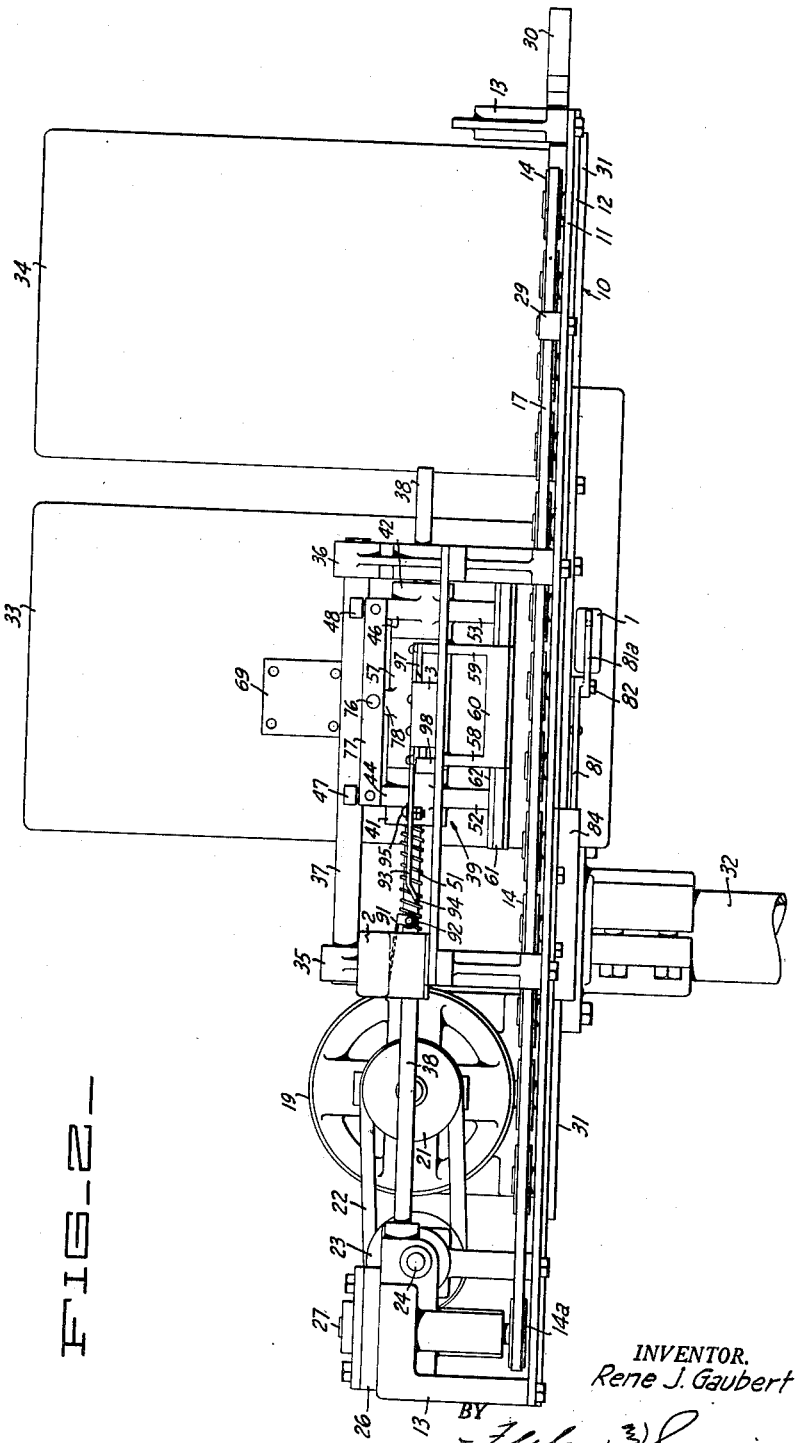

April 27, 1954
R. J. GAUBERT
2,676,444
BAG SEALING MACHINE
Filed Aug. 6, 1951
5 Sheets-Sheet 3
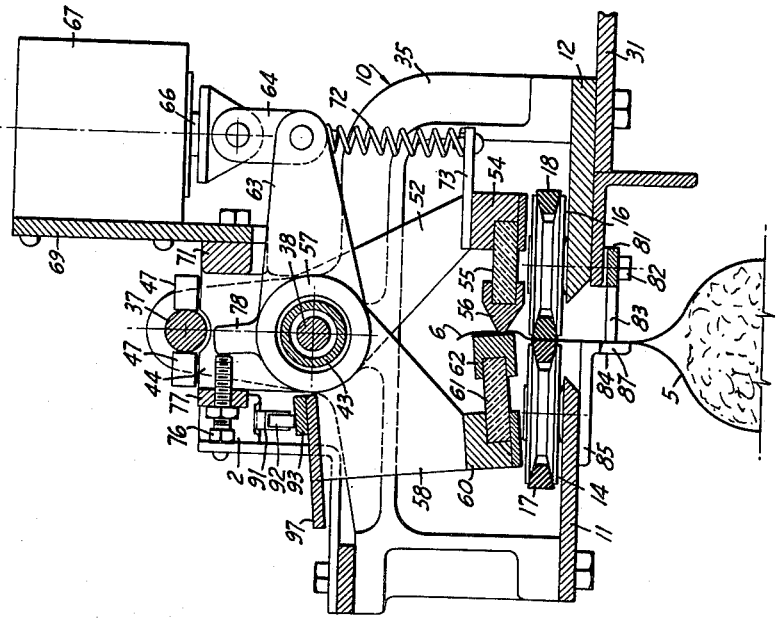
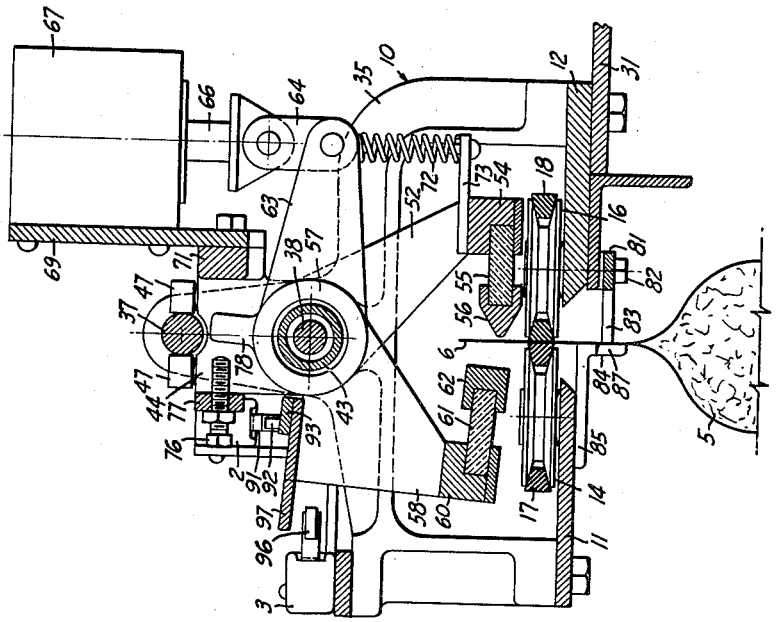
INVENTOR.
Rene J. Gaubert
BY
ATTORNEYS

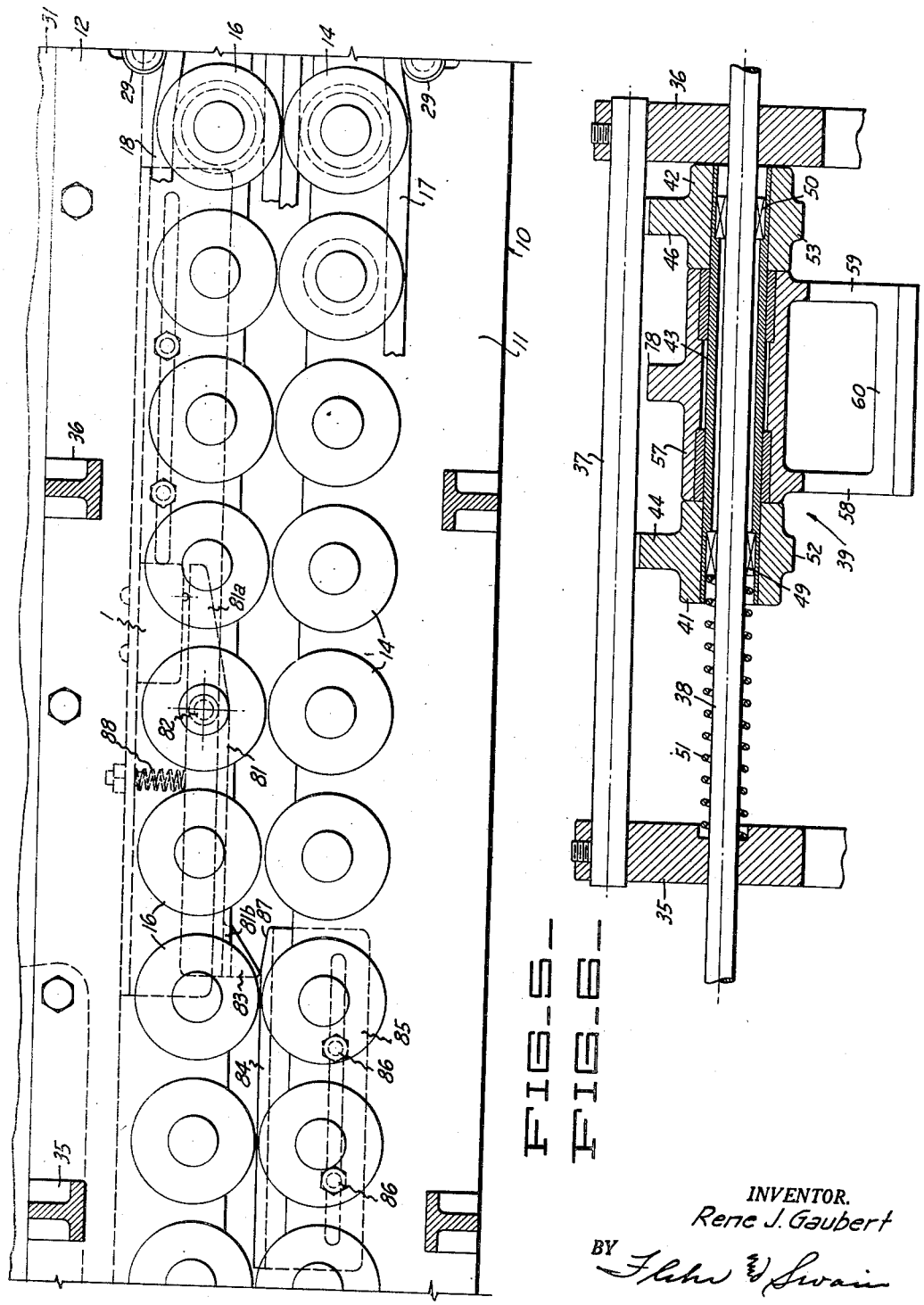

April 27, 1954          R. J. GAUBERT          2,676,444
                         BAG SEALING MACHINE
Filed Aug. 6, 1951                              5 Sheets-Sheet 5
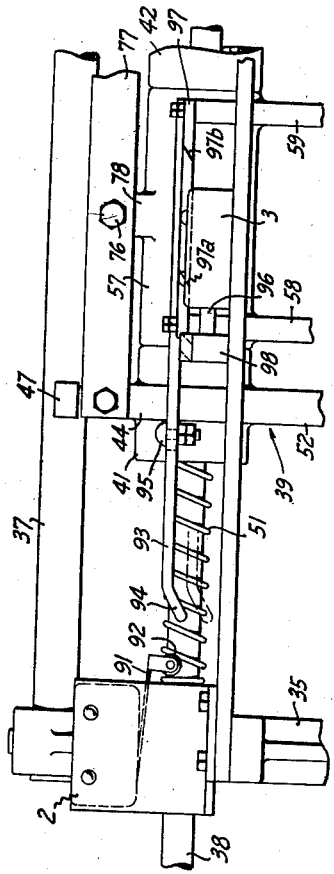
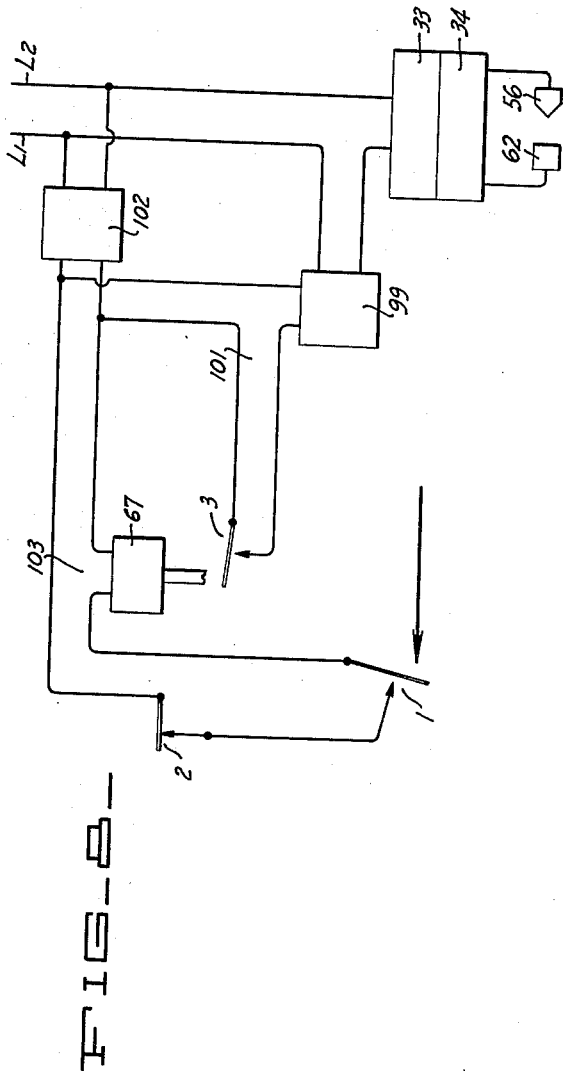
INVENTOR.
Rene J. Gaubert
BY
ATTORNEYS Patented Apr. 27, 1954

2,676,444

UNITED STATES PATENT OFFICE 2,676,444

BAG SEALING MACHINE

Rene J. Gaubert, Oakland, Calif., assignor to Simplex Packaging Machinery, Inc., Oakland, Calif., a corporation of California Application August 6, 1951, Serial No. 240,569

11 Claims. (Cl. 53—144)

This invention relates generally to apparatus for performing heat sealing operations upon the ends of bags made of materials such as moisture-proof cellophane, Pliofilm, polyethylene, Saran vinyl base membranes and the like.

In the packaging of the various products in bags made of the materials mentioned above, it has been common practice to apply a heat sealing operation across the open end of the bag after the bags have been filled. Manually operated heat sealers have been used for this purpose, and also machines which perform a heat sealing operation automatically as the bags traverse through the machine. The automatic machines have been satisfactory for some services, but have not been adaptable to all of the various bag materials suitable for heat sealing, as for example Saran which is best sealed by the use of electrical means of the high frequency capacity type. Furthermore, the automatic machines which have been available have lacked reliability and simplicity of operation and construction.

It is an object of the present invention to provide an automatic sealer of the above character which is adapted for use on a wide variety of bag-making materials, including Saran.

Another object of the invention is to provide a heat sealing machine which is reliable in operation, and which is relatively simple in its construction and operating features.

Another object of the invention is to provide an automatic bag sealer which will provide close control over the heat sealing operation and which will avoid the use of heated rollers as in prior machines.

Additional objects and features of the invention will appear from the following description in which the preferred embodiment of the invention has been set forth in detail in conjunction with the accompanying drawing.

Referring to the drawing:

Figure 2 is a front view of the machine.

Figure 3 is a cross-sectional view on an enlarged scale taken along the line 3—3 of Figure 1.

Figure 4 is a cross-sectional view like Figure 3, but with the parts in a different operating position.

Figure 5 is an enlarged detail illustrating the belt conveying means in plan, and with certain parts being broken away.

Figure 6 is an enlarged cross-sectional detail illustrating parts of the carriage means for supporting and mounting the heating electrodes.

Figure 7 is a fragmentary detail shown switch operating cam means for the carriage.

Figure 8 is a circuit diagram.

Figure 1:
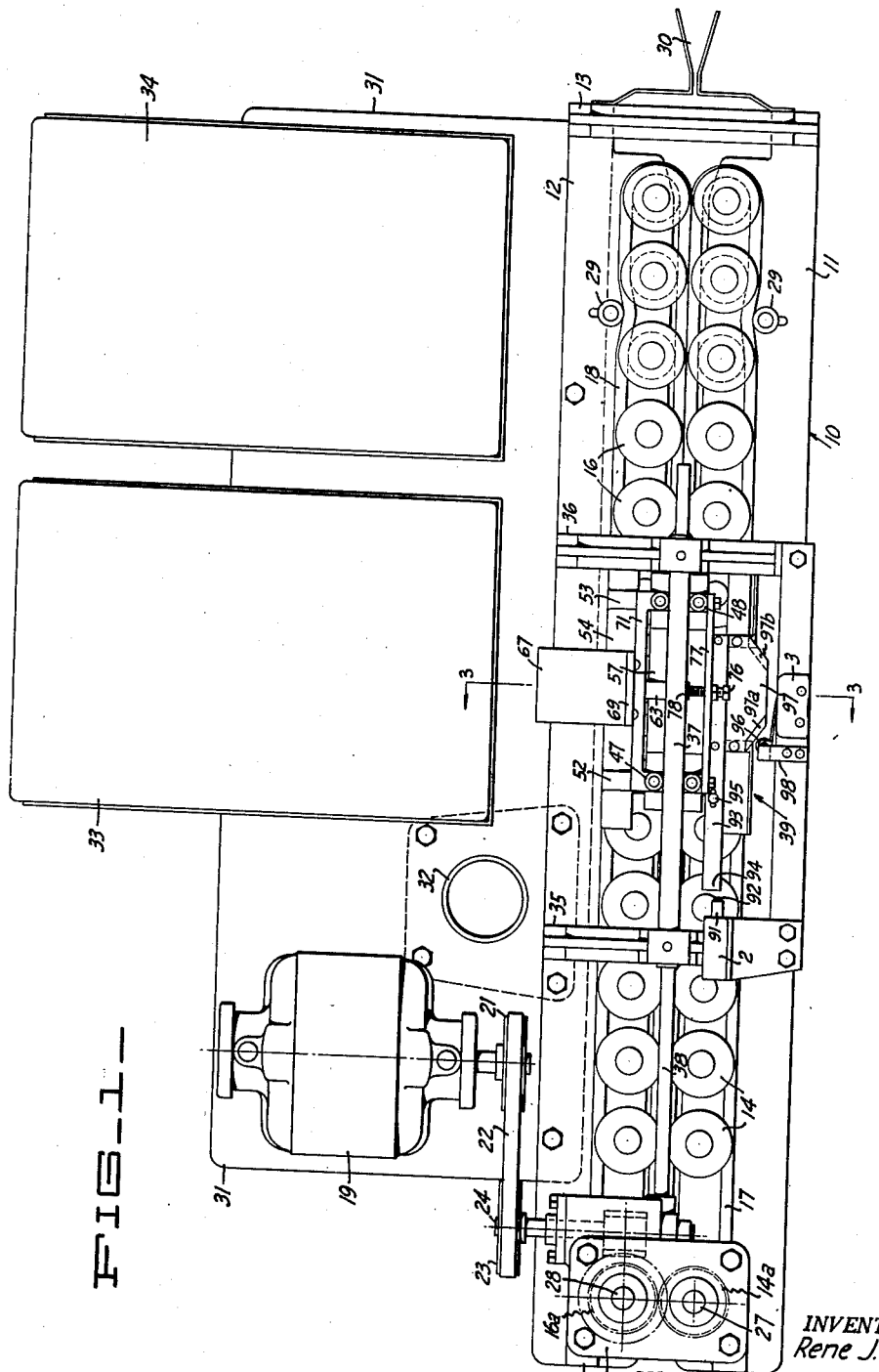
Figure 1 is a plan view of a machine incorporating the present invention.

The machine as illustrated in the drawing consists generally of a frame 10 formed by the longitudinal plates 11 and 12, and the end connecting members 13. This frame serves to support the working parts, including the bag conveying means, and the means for performing the automatic sealing operations.

The bag conveying means is of the endless belt type and consists of two series of pulley wheels 14 and 16 that are journaled upon the plates 11 and 12. Endless belts 17 and 18 are tracked upon these pulley wheels, and are preferably of the V type formed of fabric-reinforced synthetic or natural rubber. The pulleys 14a and 16a at one end of the machine are arranged to be driven by suitable means such as an electric motor 19. The drive pulley 21 of this motor is shown connected by belt 22 to the pulley 23 on the shaft 24. This shaft connects with elements of a gear train in casing 26, whereby the two vertical shafts 27 and 28, which carry the pulleys 14a and 16a, are driven at the same speed and in opposite directions. The adjacent runs of the two belts 17 and 18 are yieldably pressed together, whereby they will frictionally grip and retain the flattened top of a bag and thus carry the bag through the machine.

The outer runs of the belts are engaged by the tensioning rollers 29. The feed end of the machine (the right hand end viewed in Figure 1) is provided with guide members 30 that are flared apart to receive a bag between the same.

The frame 10 is shown secured to a horizontal mounting plate 31, that is carried to suitable support means, such as the supporting standard 32. Plate 31 also serves to mount the electric motor 19, and the electronic equipment 33 and 34 which will presently be described.

The automatic bag sealing means is arranged intermediate the ends of the frame 10, and functions to periodically grip and operate upon the tops of the bags as the bags are being carried by the conveying belts. Thus intermediate the ends of the frame 10 the plates 11 and 12 serve to support the brackets 35 and 36 (Figure 1). A pair of horizontal rods 37 and 38 are carried by these brackets, and the rod 38 may extend for attachment to the gear casing 26 (Figure 2). A carriage designated generally at 39 is slidably carried by the rod 38, and guided by rod 37. One part of this carriage includes the hubs 41 and 42 (Figure 6) that are secured to the ends of a tube 43, and which are provided with upwardly extending lugs 44 and 46. These lugs serve to mount the spaced guide rollers 47 and 48 that are positioned in close proximity with the opposite sides of the rod 37.

The tube 43 is shown provided with journals 49 and 50 for slidably engaging the rod 38. A compression spring 51 is shown engaging the tube 43 (Figure 6) in order to urge the entire carriage in one direction.

The hubs 41 and 42 carry arms 52 and 53, the lower ends of which are connected by the horizontal bar 54 (Figures 3 and 4). This bar in turn serves to carry the mounting member 55 for the electrode or heating member 56.

Between the hubs 41 and 42, there is a hub 57 which carries the depending arms 58 and 59. The lower extremities of these arms are connected by the horizontal bar 60 and this bar carries the mounting member 61 for the electrode 62 (Figures 3 and 4). The hub 57 also carries the laterally extending operating arm 63, the free end of which is connected by links 64 with the movable member 66 of an operating solenoid 67. The solenoid is carried by the mounting plate 69, which in turn is secured to a bar 71 attached to the two lugs 44 and 46. A tension spring 72 is attached to the free end of arm 63, and to a tab 73 which is secured to the bar 54. It will be evident that when the solenoid 67 is energized the arm 63 is moved upwardly as viewed in Figures 3 and 4, and this serves to swing the bar 60 and the electrode 62 toward the right as viewed in Figures 3 and 4. When the solenoid is deenergized the bar 60 together with the electrode 62 returns to the position illustrated in Figure 3. The limiting position to which the electrode 62 moves when the solenoid is energized, can be controlled by suitable means such as the adjustable stop screw 76. This screw is carried by a bar 77, which is attached at its extremities to the lugs 44 and 46. The screw 76 engages a lug 78 which is carried by the hub 57.

For the heat sealing of bags made of Saran, it is desirable to electrically connect the electrodes 56 and 62 with the terminals of a high frequency generator. The electronic equipment 33 and 34 constitutes the equipment for generating the required high frequency current, and this electronic equipment can be connected to the electrodes 56 and 62 by suitable flexible conductor leads (not shown). As is well known to those familiar with electronic heating means of the high frequency capacity type, at least one of the electrodes between which the part to be heated is placed, is faced with a suitable electrical insulating (i. e. dielectric) material. In this instance the electrode 62 is preferably faced with a suitable dielectric material, such as a sheet or ribbon of synthetic rubber. Electrode 56 may also be faced with suitable material such as cellulose acetate tape. In the event the machine is handling bags made of moisture-proof cellophane, Pliofilm, or like materials, the electrodes 56 and 62 can consist of electrically heated metal bars.

The machine is provided with certain electrical switches for securing the necessary automatic cycling. Electrical switch 1 is operated automatically when a bag has progressed a certain distance through the machine. It is suitably mounted below the plate 12 in conjunction with the operating lever 81. This lever is fulcrumed at 82, and is arranged with its one end 81a operating the switch 1, and its other end 81b provided with the bag engaging member 83. Member 83 extends in proximity with the bag engaging strip 84, the latter being a flange formed on the plate 85. Suitable means such as the screws or bolts 86 serve to adjustably secure the plate 85 to the plate 11. That end of the strip 84 which is nearest the feed end of the machine is provided with a bevel or inclination 87 for engaging and directing the advancing edges of the bags. A compression spring 88 urges the lever 81 in a direction to urge the member 83 toward the strip 84. It may be explained at this point that when the advancing edge of a bag engages the member 83 and the strip 84, the lever 81 is moved a sufficient amount to operate the switch 1.

Another electrical switch 2 has an operating member 91, which carries a cam roller 92. Roller 92 is engaged by a cam bar 93 mounted upon the members 58 and 59. One extremity 94 of this cam bar is inclined downwardly, and the upper face of the cam bar is provided with a cam button 95 (Figure 7).

An additional electrical switch 3 (Figure 1) has an operating roller 96 which is adapted to be engaged by plate 97. Plate 97 is mounted upon the members 58 and 59, which move when the solenoid is energized. When the solenoid is deenergized plate 97 is raised with respect to the roller 96, as shown in Figure 3. When the solenoid 67 is energized however, the plate 97 moves downwardly into horizontal alignment with the roller 96 whereby when the carriage moves toward the left as viewed in Figure 1, the switch 3 is operated. It may be explained that switch 3 serves to operate suitable switching means that applies high frequency electrical current to the electrodes 56 and 62.

Plate 97 also forms a part of an interlock device. Thus when the solenoid is energized the plate 97 is in such a position that as it moves to the left as viewed in Figures 1 and 7, it passes beneath the tab 98. If the solenoid should be temporarily deenergized while the plate 97 is below the tab 98, then the electrodes will be held pressed together upon the bag being sealed. Plate 97 is shown provided with oppositely beveled forward and rear edges 97a and 97b, which facilitate movement of the plate relative to the tab 98. The beveled edge 97a tends to guide the plate below the tab 98 for initial movement of the plate 97 to the left as viewed in Figure 1, and after the plate has cleared the tab 98 and the solenoid has been deenergized to permit the carriage to return to its initial position, the beveled edge 97b guides the plate 97 over the top of the tab 98.

Figure 8 is a simple circuit diagram showing the electrical connections. The current supply lines L1 and L2 are shown connected to the high frequency equipment 33, 34 in conjunction with a relay switch 99. The energizing circuit 101 for this switch includes the transformer 102 and the contacts of the switch 3. The energizing circuit 103 for the solenoid 67 is connected to the transformer 102, and is in series with the contacts of switches 1 and 2. The contacts of switch 2 are normally closed, while switch 1 is normally open. When switch 1 is closed solenoid 67 is energized, and the solenoid is deenergized when the contacts of switch 2 are opened. The electronic equipment is operated to apply high frequency current to the electrodes 56 and 62, upon closing of switch 3.

Operation of my machine can now be explained as follows: Bags are filled manually or by use of a suitable bag filling machine, and then the upper ends of the bags are flattened to form a tab. Such a bag 5 is shown being applied in Figures 3 and 4, and has an upper tab-like flattened end 6 for heat sealing. The operator guides the upper tab-like end 6 of the bag into the right hand end of the machine as viewed in Figure 2, whereby the tab 6 is engaged by the belts 17 and 18. The belts are being driven at a constant speed and serve to move the bag longitudinally through the machine. When a bag has progressed to a position in which its tab 6 extends directly between the electrodes 56 and 62, its advancing edge engages the member 83 whereby the switch 1 is closed. This serves to energize the solenoid 67, with the result that electrode 62 is immediately swung from the position shown in Figure 3 to the bag gripping position shown in Figure 4. The upper tab of the bag is now gripped between the electrodes 56 and 62, and the grip is sufficient whereby as the bag moves forwardly the entire carriage 39 moves with the bag against the compression spring 51. Simultaneously with energizing the solenoid the plate 97 is moved into horizontal alignment with the roller 96 of the switch 3. Also the bar 93 is moved downwardly so that as it advances toward the roller 92, it will pass beneath the roller without operating the switch 2. After initial movement of the carriage 39 takes place, switch 3 is operated whereby the electronic equipment 33, 34 supplies high frequency electrical current to the electrodes for the heat sealing operation.

After a predetermined interval during which time the carriage 39 has moved forwardly, the plate 97 clears the roller 96 and the tab 98 whereby switch 3 is opened to interrupt further supply of high frequency current. Shortly thereafter the cam button 95 engages the roller 92 to operate the switch 2. Operation of this switch to open its contacts, opens the energizing circuit 103 for the solenoid 67, and thus the solenoid is deenergized. When the solenoid is deenergized electrode 62 moves back to the position shown in Figure 3, and this serves to release the grip upon the bag, whereby the carriage 39 now moves back to the initial position shown in Figure 2, under the urge of the spring 51. Also simultaneously with deenergizing of the solenoid, plate 97 is moved upwardly to clear the tab 98, and to prevent operation of the switch 3 as the carriage moves back to its initial position. The heat sealed bag continues to move through the machine and is discharged from the left hand end of the machine as viewed in Figure 1.

It will be evident from the foregoing that I have provided a machine capable of performing a variety of bag sealing operations. As previously mentioned, with material like Saran, it is desirable to make use of high frequency heat sealing means of the capacity type. With such heat sealing means it is desirable to apply and interrupt the high frequency electrical current in conjunction with movements of the carriage 39. In instances where high frequency sealing means is not employed, the switch 3 and its operating means can be omitted. Thus in the heat sealing of bags made of such materials as moisture-proof cellophane, Pliofilm, or polyethylene, electrodes 56 and 62 may consist of metal bars heated by use of conventional electrical heating elements, and the current supplied to these heating elements can be continuous.

I claim:

1. In a machine for heat sealing bags, means for conveying bags along a predetermined path through the machine, with the tops of the bags extending upwardly and flattened, a pair of heat sealing members adapted to clamp the flattened tops of the bags between the same to perform heat sealing operations, a carriage serving to mount said members, tracking means for said carriage for movement of the carriage along a path parallel to movement of the bags through the machine, means for yieldably urging the carriage in a direction opposite to the direction of movement of the bags through the machine and toward a limiting stop position, electrical motive means adapted when energized to cause clamping of said heat sealing members across the flattened end of a bag whereby said members together with the carriage move in synchronism with the bag until said members are released, electrical circuit means for energizing said motive means and including a first and a second electrical switch, said first switch being disposed to be operated by movement of the bags through the machine to cause said motive means to be energized to thereby cause the heat sealing members to clamp upon the top of a bag, and means carried by the carriage and serving to operate said second switch, said second switch when operated serving to deenergize said motive means to effect release of the heat sealing members with respect to the top of the bag and to thereby cause the carriage to return to said limiting position.

2. In a machine for heat sealing bags, means for conveying bags along a predetermined path through the machine, a pair of heat sealing members adapted to be positioned in gripping relation with the flattened tops of the bags, one of said members being movable toward and away from the other member, a carriage serving to mount said members, one of said members being mounted for pivotal swinging movement with respect to the other member, tracking means for said carriage whereby said carriage is movable along a path parallel to the path of movement of the bags, means for yieldably uring the carriage in a direction opposite to the direction of movement of the bags through the machine and toward a limiting position of the carriage means including a solenoid supported by the carriage and connected to operate said one sealing member toward or away from the other member, electrical circuit means connected to said solenoid to energize same, said solenoid when energized serving to cause said heat sealing members to grip the flattened top of a bag and thereby cause the carriage together with said members to move along with the bag for a heat sealing operation, a first switch included in said circuit means for controlling the same, means serving to operate said first switch including a member extending into the path of movement of the tops of the bags, said member when moved by engagement with the top of a bag serving to close its associated switch, a second normally closed switch included in said circuit means and serving when opened to cause said solenoid to be deenergized, means for operating said second named switch including a cam element, said cam element being mounted to move with swinging movement of said one heat sealing member, said cam element including a portion adapted to actuate said second named switch to open the same after the carriage has moved a predetermined distance to complete a heat sealing operation, said cam element also including a portion serving to retain said second switch actuated during return movement of the carriage to its initial limiting position.

3. A heat sealing machine as in claim 2 in which means is provided for supplying high frequency electrical energy to said heat sealing members, and in which said members are electrodes adapted to cause heat sealing by dielectric losses.

4. In a machine for heat sealing bags after the insertion of a product therein, means for conveying separate bags along a predetermined path through the machine with the tops of the bags being flattened and aligned in a common plane, a pair of heat sealing members adapted to releasably clamp upon flattened tops of the bags, a carriage serving to mount said members, means for tracking said carriage for movement of the same in a direction parallel to said plane and to the path of movement of the bags through the machine, and means including a member contacted by the tops of the bags during their movement through the machine for actuating said members to clamp and release the tops of the bags.

5. In a machine for heat sealing bags after the insertion of a product therein, means for conveying the separate bags along a predetermined path through the machine with the tops of the bags being flattened and extending upwardly in a common plane, a pair of heat sealing members adapted to clamp upon opposite sides of the flattened tops of the bags, a carriage serving to mount said members, means serving to track the carriage for movement of the carriage along a path parallel to the path of movement of the bags, means serving to yieldably urge the carriage toward one limiting position of the same and in a direction opposite to the direction of movement of the bags through the machine, means adapted to be energized to position said sealing members in clamping and gripping relation with the flattened tops of a bag whereby during such gripping relation the carriage and said members are caused to move along with the gripped bag, and bag engaging control means for energizing said actuating means.

6. A machine as in claim 1 in which the means serving to operate said second switch is a cam, the cam having a portion serving to retain the second switch closed during return movement of the carriage.

7. A heat sealing machine as in claim 1 in which said motive means is a solenoid mounted upon the carriage.

8. A machine as in claim 3 together with switching means for applying high frequency current to said electrodes only while the electrodes grip a bag.

9. In a machine for heat sealing bags, conveyor means for moving a bag along a predetermined path with the open end of the bag in flattened condition, a carriage mounted for movement along a path parallel to said predetermined path, a pair of heat sealing members carried by said movable carriage, means adapted to be energized for moving said members into clamping engagement with the flattened end of the bag to lock said carriage for conjoint movement with the bag as it is advanced by said conveyor means, and means for controlling energization of said last means to maintain such clamping engagement for a predetermined period of such conjoint movement.

10. In a machine for heat sealing bags, conveyor means for moving a bag along a predetermined path with the open end of the bag in flattened condition, a carriage mounted for movement along a path parallel to said predetermined path, a pair of heat sealing members carried by said carriage and arranged to releasably clamp the flattened end of the bag as it is moved along by said conveyor means, the clamping engagement of said heat sealing members with the flattened bag end being effective to cause said carriage to move along with the bag, control means operable upon actuation to energize said heat sealing members, and means responsive to movement of said carriage for actuating said control means.

11. In a machine for heat sealing bags, conveyor means for moving a bag along a predetermined path with the open end of the bag in flattened condition, a carriage mounted for movement along a path parallel to said predetermined path, a pair of heat sealing members carried by said carriage and arranged to releasably clamp the flattened end of the bag as it is moved along by said conveyor means, the clamping engagement of said heat sealing members with the flattened bag end being effective to cause said carriage to move along with the bag, control means operable upon actuation to energize said heat sealing members, and means carried by said carriage for actuating said control means to energize said heat sealing means and retain said control means in actuated position during a predetermined extent of movement of said carriage.

References Cited in the file of this patent

UNITED STATES PATENTS

| Number | Name | Date |
| --- | --- | --- |
| 2,432,412 | Hacklander | Dec. 9, 1947 |
| 2,439,918 | Auxier et al. | Apr. 20, 1948 |
| 2,446,623 | Welch | Aug. 10, 1948 |
| 2,467,879 | Billeb | Apr. 19, 1949 |